(12) United States Patent
Rakowski et al.

(10) Patent No.: US 8,463,767 B2
(45) Date of Patent: *Jun. 11, 2013

(54) DECENTRALISED WEB ANNOTATION (75) Inventors: Brian Rakowski, Menlo Park, CA (US); Aaron Boodman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,501

(22) Filed: Jan. 4, 2012

(65) Prior Publication Data

US 2012/0173503 A1  Jul. 5, 2012

Related U.S. Application Data (63) Continuation of application No. 12/795,380, filed on Jun. 7, 2010, now Pat. No. 8,095,528, which is a continuation of application No. 11/298,944, filed on Dec. 12, 2005, now Pat. No. 7,734,610.

(51) Int. Cl.
G06F 7/00 (2006.01)
G06F 17/30 (2006.01)
(52) U.S. Cl.
USPC ............................ 707/706; 707/723; 715/760
(58) Field of Classification Search
USPC .................. 707/706, 707, 769, 770; 715/760
See application file for complete search history.

(56) References Cited

U.S. PATENT DOCUMENTS

| | | | |
|---|---|---|---|
| 6,282,548 B1 | 8/2001 | Burner et al. | |
| 6,611,835 B1 | 8/2003 | Huang et al. | |
| 7,734,610 B2 | 6/2010 | Rakowski et al. | |
| 7,818,394 B1 | 10/2010 | Lawler et al. | |
| 7,873,468 B2 | 1/2011 | Matsuura et al. | |
| 2004/0225716 A1 | 11/2004 | Shamir et al. | |
| 2005/0177805 A1 | 8/2005 | Lynch et al. | |
| 2006/0284744 A1 | 12/2006 | Shotland | |

FOREIGN PATENT DOCUMENTS

| | | |
|---|---|---|
| JP | 2007-517308 | 6/2007 |
| WO | WO 02/091193 A1 | 11/2002 |
| WO | WO 2005/033977 | 4/2005 |

OTHER PUBLICATIONS

Mark Shewhart et al., "Monitoring a newsfeed for hot topics", 1999, ProceedingKDD '99 Proceedings of the fifth ASM SIGKDD international conference on Knowledge discovery and data mining, ACM, 402-404.*

WDG Development Project, Standard Guide to Website Direction, Works Corporation Inc., Takeshi Tonomori, Sep. 19, 2005, 2nd Edition, p. 280.

Tomohiro Asada, Network Magazine, ASCII Coproration, Apr. 28, 2005, No. 10, No. 6, pp. 48-49.

(Continued)

Primary Examiner — Jean B Fleurantin
(74) Attorney, Agent, or Firm — Harrity & Harrity, LLP (57) ABSTRACT

Annotations relating to web sites may be based on blog posts relating to the web sites. A user viewing a web site may concurrently view related blog posts about the web site. More particularly, in one implementation, a method includes detecting when a user visits a web page and receiving, in response to the detection, a group of blog posts that link to the web page. The method further includes displaying an indication of the group of blog posts to the user while the user is visiting the web site.

20 Claims, 10 Drawing Sheets

OTHER PUBLICATIONS

Sarah Milstein, Google—The Missing Manual, Macintosh/Windows Google, O'Reilly Japan, Inc. O'Reilly Team, Nov. 25, 2004, 1st Edition, 4, 191, p. 274.

Co-pending U.S. Appl. No. 12/795,380, filed Jun. 7, 2010 entitled "Decentralised Web Annotation" by Brian Rakowski et al., 36 pages.

Evans et al., "Search adaptations and the challenges of the Web," May-Jun. 2005, IEEE, vol. 9, pp. 19-26.

Gruhl et al., "Information diffusion through blogspace," Dec. 2004, ACM, vol. 6, pp. 43-52.

Supplementary European Search Report, corresponding to EP 06 84 6568, mailed Nov. 16, 2009, 8 pages.

Fujimura et al., "The EigenRumor Algorithm for Ranking Blogs", http://www.blogpulse.com/papers/2005/fujimura.pdf, XP002553648, WWW 2005, May 10-14, 2005, 6 pages.

Herring et al., "Bridging the gap: a genre analysis of Weblogs," Jan. 5-8, 2004, IEEE, pp. 1-11.

Needleman, "BlogRovr Plugs You Into Your Favorite Blogs, Even When You're Not Reading Them," http://news.cnet.com/8301-17939_109-9703781-2.html, Mar. 30, 2007, 3 pages.

International Preliminary Report on Patentability dated Jun. 26, 2008, issued in corresponding PCT application No. PCT/US2006/061922, 7 pages.

International Search Report and Written Opinion dated Mar. 14, 2008, issued in corresponding PCT application No. PCT/US2006/061922, 10 pages.

Kumar, "Wired News: Third Voice Trails Off . . . ," http://wired-vig.wired.com/news/business/0,1367,42803,00.html, Apr. 4, 2001, 2 pages.

Goldman, "Blogger Buzz: Introducing Backlinks," http://buzz.blogger.com/2005/10/introducing-backlinks.html, Oct. 7, 2005, 1 page.

McDonald, "Third Voice: Invisible Web Graffiti," PC World, http://www.pcworld.com/resource/printable/article/0,aid,11016,00.asp, May 18, 1999, 1 page.

Chiho Masuda, Google Toolbar, Japanese Version, 2.0.114.9, PC Japan, vol. 10, No. 5, Japan, Softbank Publishing Corp., Apr. 19, 2005, p. 24-25. (Includes partial English translation).

Fumito Nishino, "Web Mining for Hot Topic Monitoring", Proceedings for the Eighth Annual Meeting of The Association for Natural Language Processing, Japan, Mar. 18, 2002 p. 463-466. (Includes partial English translation).

Hiroyuki Takahashi, "Google is not Dedicated Only of Websearch!" 100 Times More Useful Ways to Utilize Google, Network World, vol. 11, No. 1, IDG Japan, No. 22, 2005, p. 78-91. (Includes partial English translation).

Tsuyoshi Murata, "Discovering Relation of Web Pages Based on Backlinks", $41^{st}$ Japanese Society for Artificial Intelligence Material (SIG-FAI-A001), Jul. 7, 2000, p. 13-18.

\* cited by examiner

DECENTRALISED WEB ANNOTATION

RELATED APPLICATIONS

This application is a continuation of U.S. application Ser. No. 12/795,380, filed Jun. 7, 2010, which is a continuation of U.S. application Ser. No. 11/298,944, filed Dec. 12, 2005, now U.S. Pat. No. 7,734,610. The entire disclosures of these applications are incorporated herein by reference.

BACKGROUND

A. Field of the Invention

Implementations consistent with the principles of the invention relate generally to information dissemination and, more particularly, to decentralized techniques for allowing web annotation.

B. Description of Related Art

The World Wide Web ("web") contains a vast amount of information. When browsing a particular document on the web, such as a web page, users are typically limited to only viewing the web page itself. Supplementary information, such as information provided by other web sites or other web users about the particular site being viewed, can be difficult to easily view. For example, assume that a user is viewing the manufacturer's web page relating to a product the user is interested in purchasing. To see other web pages reviewing or commenting on the product, the user may need to separately search for other web sites pages that contain formal reviews or other comments about the product.

One attempt to allow users to annotate particular web pages with comments that could be viewed by other users when visiting the web page was the "Third Voice" browser plug-in. Third Voice allowed users to post public notes about a web site that could then be seen by other Third Voices users that later visit the web site. One problem suffered by this product was that comments about a web site were often "low quality" comments that were spammy and/or inappropriate.

SUMMARY

One aspect is directed to a method that includes detecting when a user visits a web site; receiving, in response to the detection, a group of blog posts that link to the web site; and displaying an indication of the group of blog posts to the user while the user is visiting the web site.

Another aspect is directed to a method including detecting when a user visits a web site and submitting, in response to the detection, a search query to a search engine. The search query requests documents relevant to the web site. The method further includes receiving documents in response to the submitted search query and displaying an indication of the documents to the user while the user is visiting the web site.

Yet another aspect is directed to a system including a blog search engine and a client device connected to the blog search engine over a network. The client device includes a software component configured to display web sites to users and to concurrently determine and display portions of blog posts that link to a currently displayed web site. The blog posts are determined based on a query to the blog search engine for blog posts linking to the currently displayed web site.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The detailed description does not limit the invention.

OVERVIEW

As described herein, an easy entry point is provided through which users may annotate web pages and see other users' annotations. The annotations may be taken from blog posts relating to the web page being annotated.

A "blog," which is a shortened term for weblog, may be defined as a website through which an individual or a group generates text, photographs, video, audio files, and/or links, typically but not always on a daily or otherwise regular basis. Authoring a blog, maintaining a blog or adding an article to an existing blog is called "blogging". Individual articles on a blog are called "blog posts", "posts", or "entries". The person who posts these entries is called a "blogger". Frequently, bloggers generate posts that comment on and/or link to other web pages.

Consistent with an aspect of the invention, a user viewing a web site may concurrently view blog posts about the web site. By using blog posts as annotation information for a web site, inappropriate or spammy comments about a web site can be reduced, as blog posts tend to have an inherent level of seriousness associated with them and the blog posts can be ranked or otherwise filtered based on the quality of the underlying blog.

System Description

Figure 1:
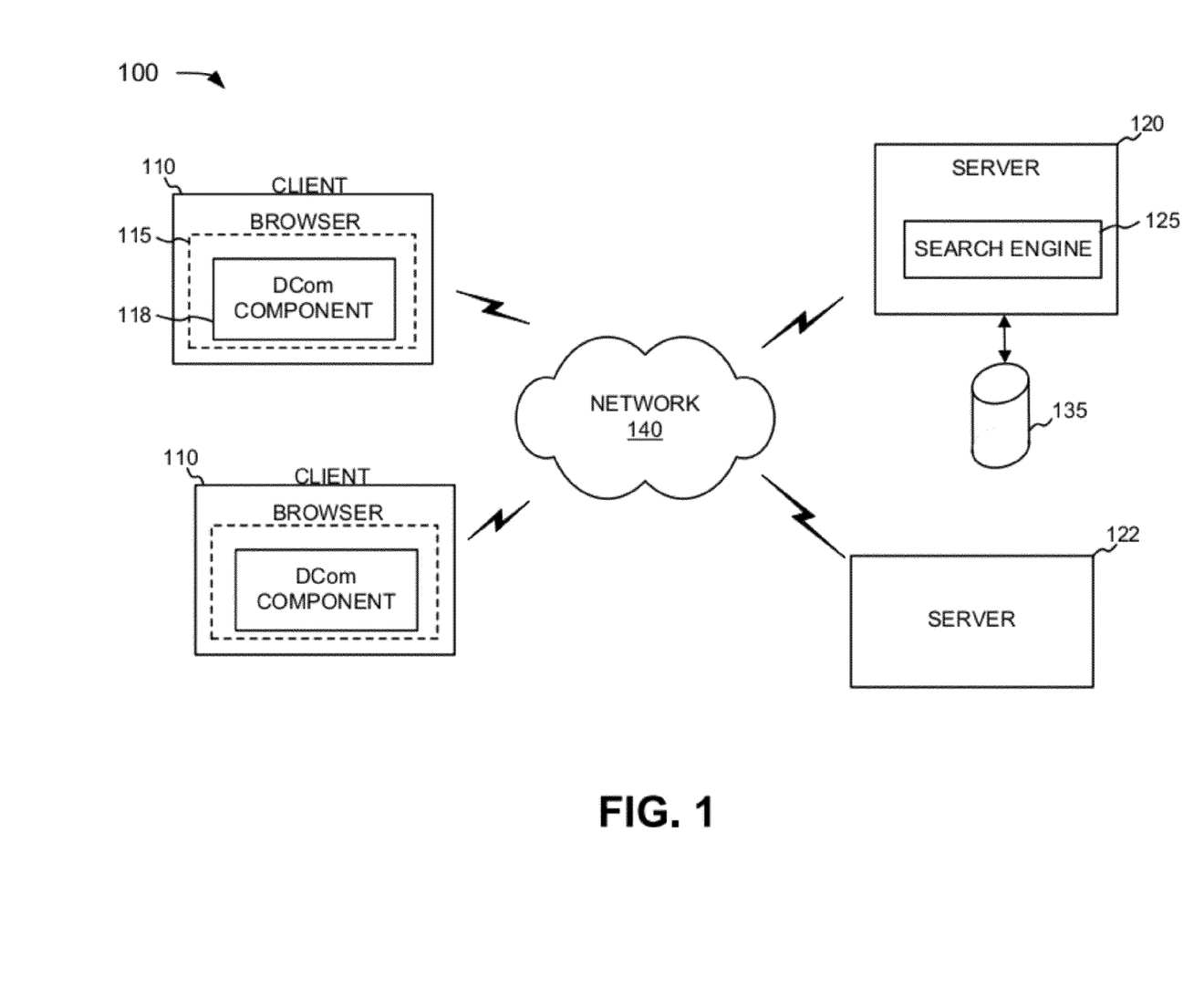
FIG. 1 is a diagram of an exemplary system in which concepts consistent with the principles of the invention may be implemented.

FIG. 1 is an exemplary diagram of a system 100 in which concepts consistent with the principles of the invention may be implemented. System 100 may include clients 110 coupled to servers 120 and 122 via a network 140. Network 140 may include a local area network (LAN), a wide area network (WAN), a telephone network, such as the Public Switched Telephone Network (PSTN), an intranet, the Internet, or a combination of networks. Two clients 110 and two servers 120 and 122 have been illustrated as connected to network 140 for simplicity. In practice, there may be more clients and/or servers. Also, in some instances, a client may perform the functions of a server and a server may perform the functions of a client.

Clients 110 may include a device, such as a wireless telephone, a personal computer, a personal digital assistant (PDA), a lap top, or another type of computation or communication device, a thread or process running on one of these devices, and/or an object executable by one of these devices. Clients 110 may include software such as a browser 115 that is used to access and display web pages from a web server such as server 120 or 122. Browser 115 may include, for example, the Firefox™ browser. Clients 110 may additionally include a software component designed to interact with browser 115 to allow users to annotate and view annotations relating to web pages. This software component will be referred to herein as DCom (Distributed Web Comments) component 118. DCom component 118 may be, for example, in some implementations, a web browser plugin or extension. In other implementations, DCom component 118 may be a separate program on client 110.

Servers 120 and 122 may provide services on behalf of clients 110, and may include, for example, a web server, a file server, or an application server. In one implementation, server 120 may include a search engine 125 usable by clients 110. Search engine 125 may be a query-based document search engine. Search engine 125 may be designed to return links to web pages that include information relevant to a search query. Search engine 125 may be a specialized search engine, such as a blog search engine designed to return blog posts or links that are relevant to user's search query.

Search engine 125 may respond to user search queries based on documents stored in database 135. The documents stored in database 135 may include web pages that are connected to network 140 and that were previously crawled and indexed by search engine 125. When search engine 125 is a blog search engine, the documents stored in database 135 may be indexed blog posts or blogs. Although shown as a single database in FIG. 1, database 135 could be distributed over multiple storage devices. Similarly, although shown as a single device in FIG. 1, servers 120/122 and search engine 125 may be implemented in a distributed manner over multiple computing devices.

Figure 2:
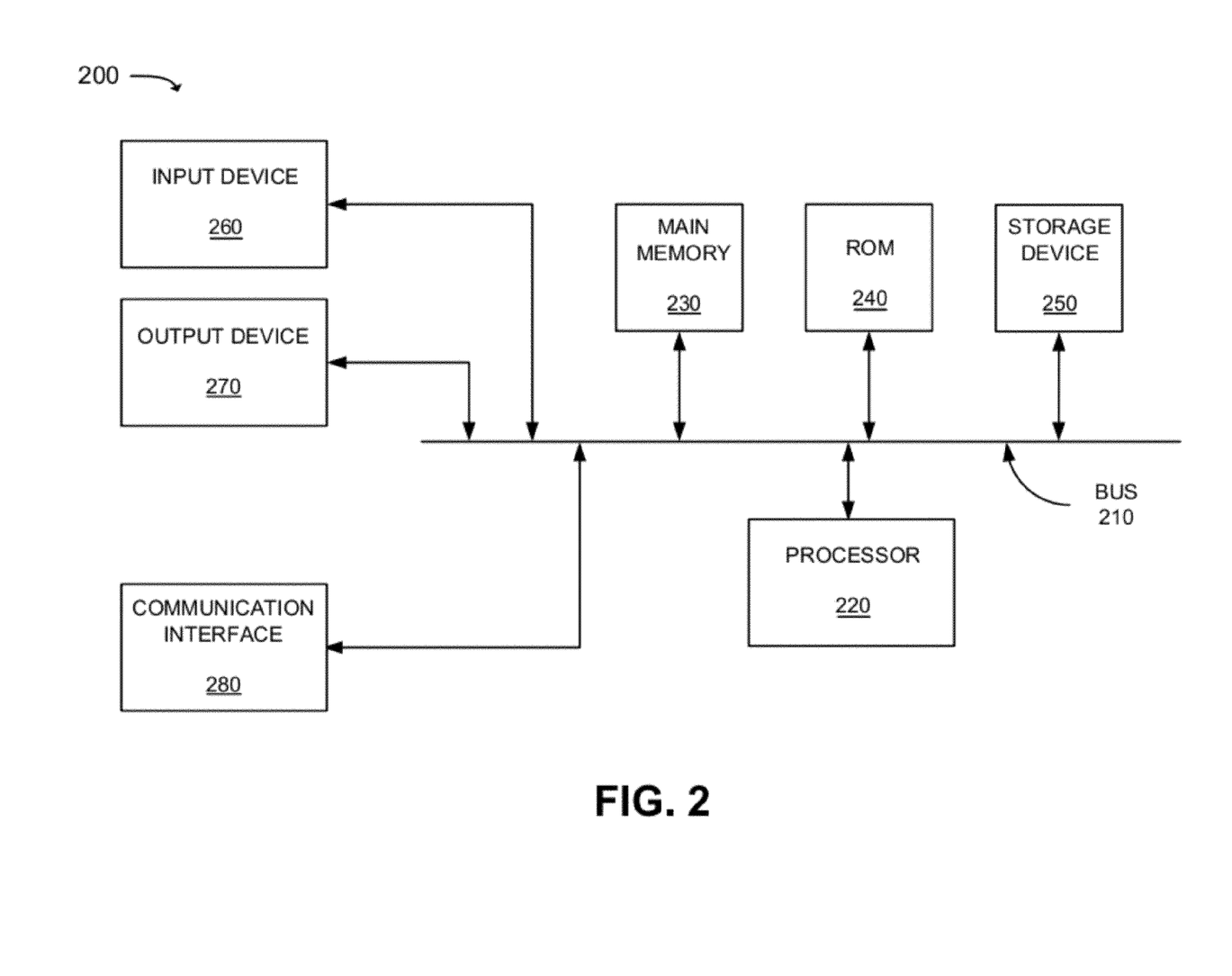
FIG. 2 is a diagram of an exemplary client or server shown in FIG. 1.

FIG. 2 is an exemplary diagram of a client 110, server 120, or server 122, referred to as computing device 200, according to an implementation consistent with the principles of the invention. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of processor, microprocessor, or processing logic that may interpret and execute instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include a mechanism that permits a user to input information to computing device 200, such as a keyboard, a mouse, a pen, voice recognition and/or biometric mechanisms, etc. Output device 270 may include a mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 140.

Software components of system 100, such as search engine 125, browser 115, and DCom component 118 may be stored in a computer-readable medium, such as memory 230. A computer-readable medium may be defined as one or more physical or logical memory devices and/or carrier waves. The software instructions defining the software components may be read into memory 230 from another computer-readable medium, such as data storage device 250, or from another device via communication interface 280. The software instructions contained in memory 230 cause processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Operation of DCom Component 118

Figure 3A:
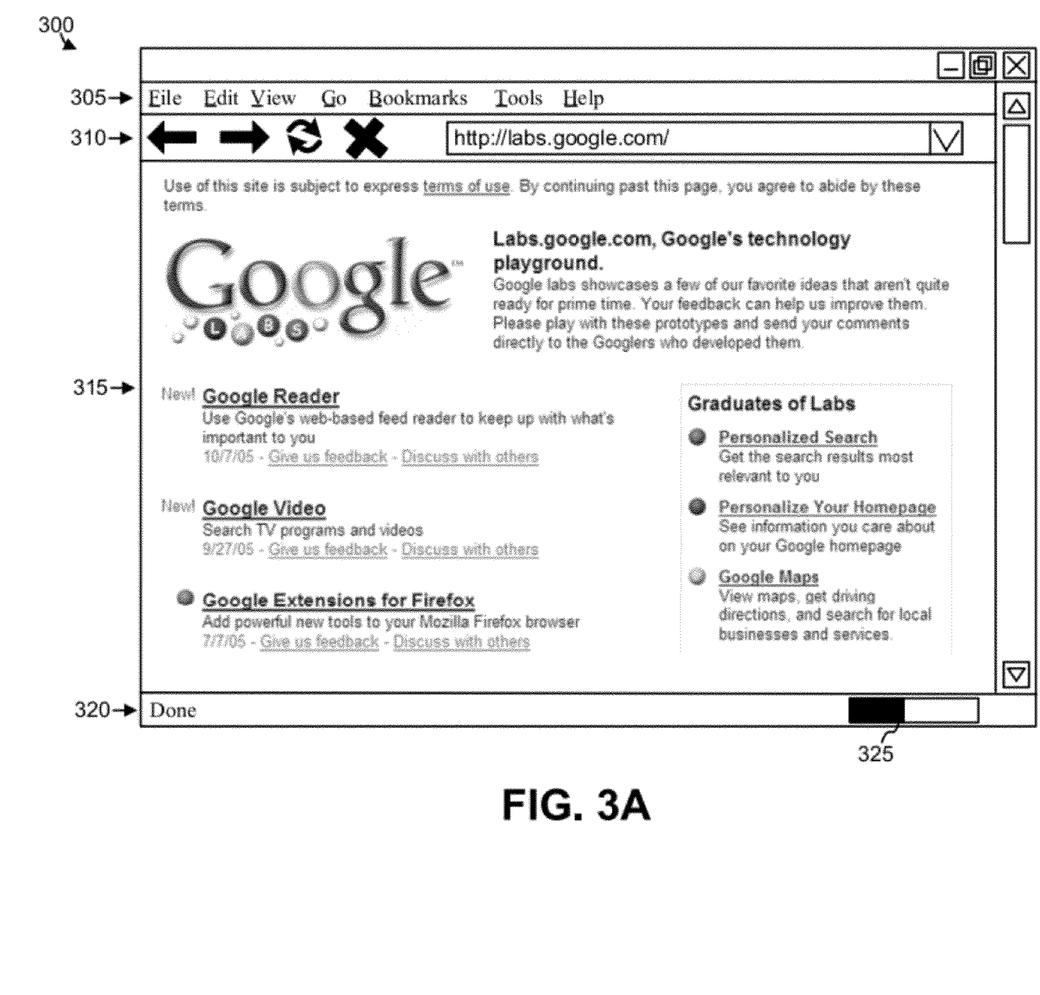
FIGS. 3A and 3B are diagrams of exemplary graphical user interfaces presented to a user by the DCom ("Distributed Web Comments") component and browser shown in FIG. 1.

FIG. 3A is a diagram illustrating an exemplary graphical user interface 300 for a web browser 115 presented to a client 110 using DCom component 118. User interface 300 may include menu section 305, navigation toolbar 310, a web page display section 315, and a status bar 320. Menu section 305 presents a number of menus to the user through which the user may control the operation of web browser 115. Navigation toolbar 310 may include one or more controls through which the user can control web browser 115 when navigating the web, such as "forward" and "back" buttons and an input box to enter uniform resource locators (URLs). Web page display section 315 may present the web page currently being visited and status bar 320 may display status information relating to the operation of web browser 115.

Status bar 320 may additionally display an indication of how highly the web site or web page currently being visited (i.e., the site in display section 315) is annotated. In the example shown in FIG. 3A, this function is performed via a "buzz" icon 325, which is illustrated as a graphical meter. Buzz icon 325 may be displayed in status bar 320 on behalf of or under the control of DCom component 118. Buzz icon 325 may change based on a "buzz rating" determined based on the annotations associated with the current web site. For example, when a user is visiting a web site with no associated annotations, buzz icon 325 may not be shown or may be shown as an graphical bar or meter with an empty or zero reading. When a user is visiting a web site with annotations, buzz icon 325 may change to reflect the number, quality, and/or temporal relevance of the annotations. For example, a user visiting a site with a lot of annotations may see a buzz icon with a full meter reading. In some implementations, the size or color of buzz icon 325 may also change. The particular design used by buzz icon 325 to reflect the annotations for a site is not critical. In general, buzz icon 325 may be designed so that sites with a high "buzz" rating are given a "stronger" icon, where the buzz rating may be based on some combination of the number, quality, or timeliness of the annotations associated with the web site. In some implementations, timeliness of the annotations for a site may be based on timeliness relative to the last time the user visited a site. In other words, buzz icon 325 may indicate how much the annotations for the site have changed since the last time the user visited the site.

Additionally, in some implementations, the functionality of buzz icon 325 may be presented to the user in sections of browser 115 other than status bar 320.

Figure 3B:
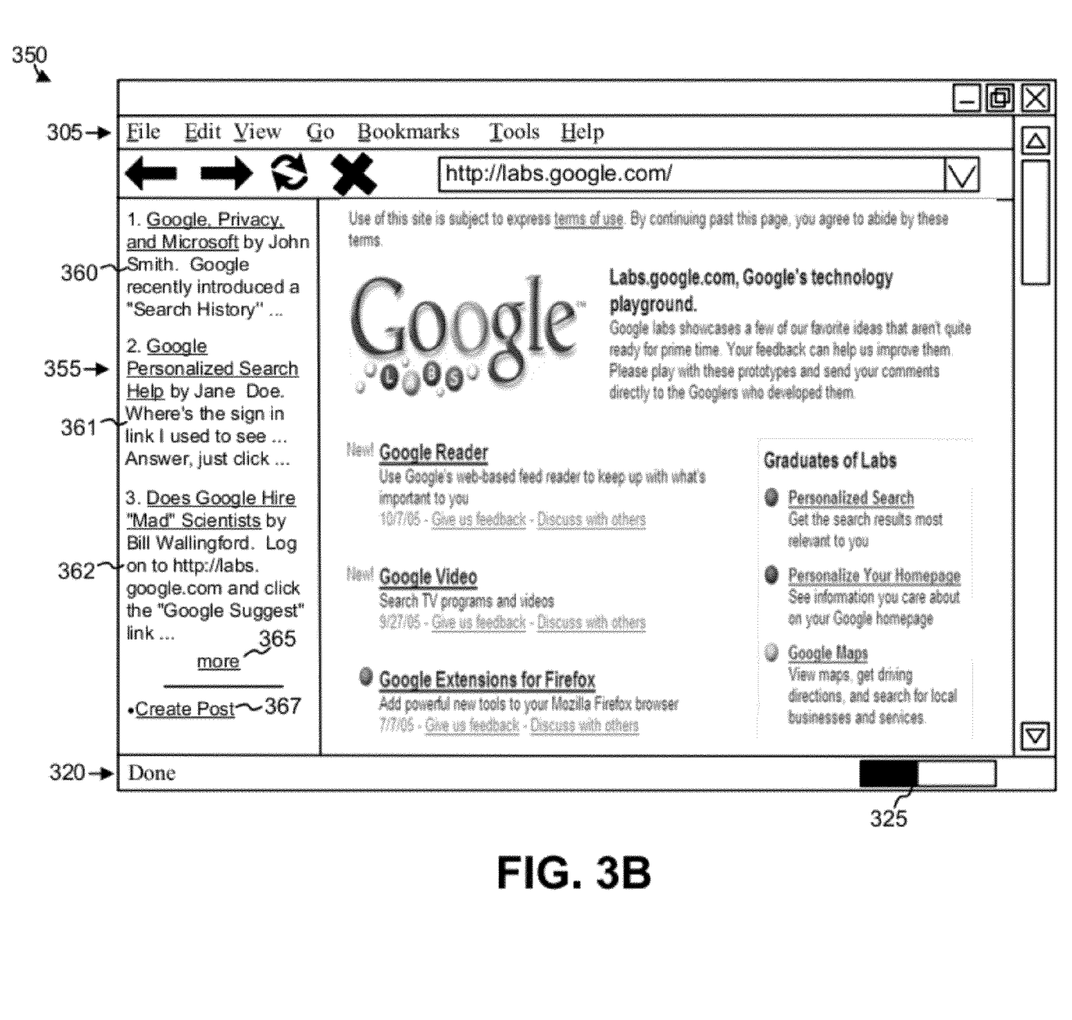

FIG. 3B is a diagram illustrating a second exemplary graphical user interface 350 for a web browser 115 presented to a client 110 using DCom component 118. Graphical user interface 350 is similar to graphical user interface 300, except that a sidebar 355 is additionally shown within web page display section 315. Sidebar 355 may be displayed in response to the user indicating an interest in the annotations for a site. For example, the user may be able to toggle sidebar 355 by clicking on buzz icon 325, by typing a specific keyboard combination, or by selecting the sidebar from menu 305.

Sidebar 355 may display the annotations, portions of the annotations, or links to the annotations associated with a particular site. Sidebar 355 may additionally allow the user to post comments to his/her blog about the site.

As shown in the example of FIG. 3B, sidebar 355 displays portions of three blog posts, labeled as posts 360-362, that link to the current web site. Each blog post 360-362 may include a link (i.e., the underlined portion), that, when selected by the user, may take the user to the web page corresponding to the selected blog post. Sidebar 355 may additionally include a "more" link 365 that, when selected, causes additional annotations to be shown, and a "create post" link 367 that, when selected, may provide a convenient entry point through which the user may create a blog post in their own blog about the web site.

The operation of DCom component 118 in conjunction with browser 115 will next be described in more detail with reference to the flow charts shown in FIGS. 4-6.

Figure 4:
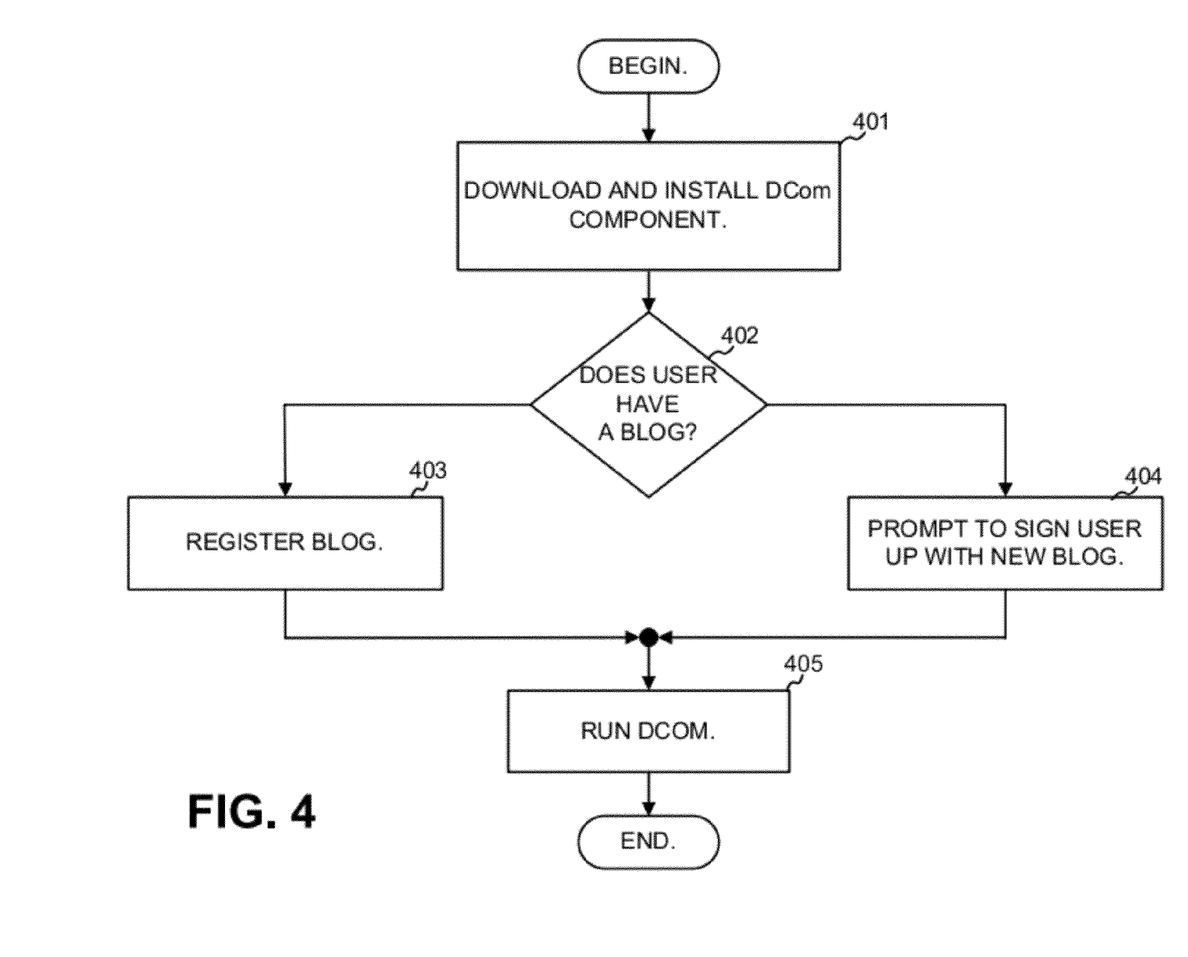
FIG. 4 is a flowchart illustrating exemplary operations through which a user may initially install or configure the DCom component.

FIG. 4 is a flowchart illustrating exemplary operations through which a user may initially install or configure DCom component 118. The user may initially install DCom component 118 at client computer 110 at which DCom component 118 is to be used (act 401). DCom component 118 may be a browser plugin, extension, or other browser addon component that is downloaded from server 120 or 122. In other implementations, DCom component 118 may be script or other code that can be downloaded and run by client 110 on an as-needed basis. In still other implementations, DCom component 118 may be a separate application that runs in parallel with browser 115 at client 110.

When initially running DCom component 118, the user may be queried to determine whether they have a blog hosted at a site recognized by DCom component 118 (act 402). If yes, the user may enter their registration information, such as their username and password, for their blog (act 403). This information may be later used to allow the user to post or to begin a post from within sidebar 355. If the user does not have a blog hosted at a site recognized by DCom component 118, the user may be prompted to determine whether they would like to sign up for a new blog (act 404). If the user decides they would like to sign up for a new blog, a new web page may be opened at a registration page for the new blog.

After the initial installation, login, and/or registration shown in acts 401-404, DCom component 118 may execute normally on client 110 (act 405). Normal execution of DCom component 118 will be described in more detail below with reference to FIGS. 5 and 6. After initial installation and registration, acts 401-403 may not need to be performed each time the user uses client 110.

Figure 5:
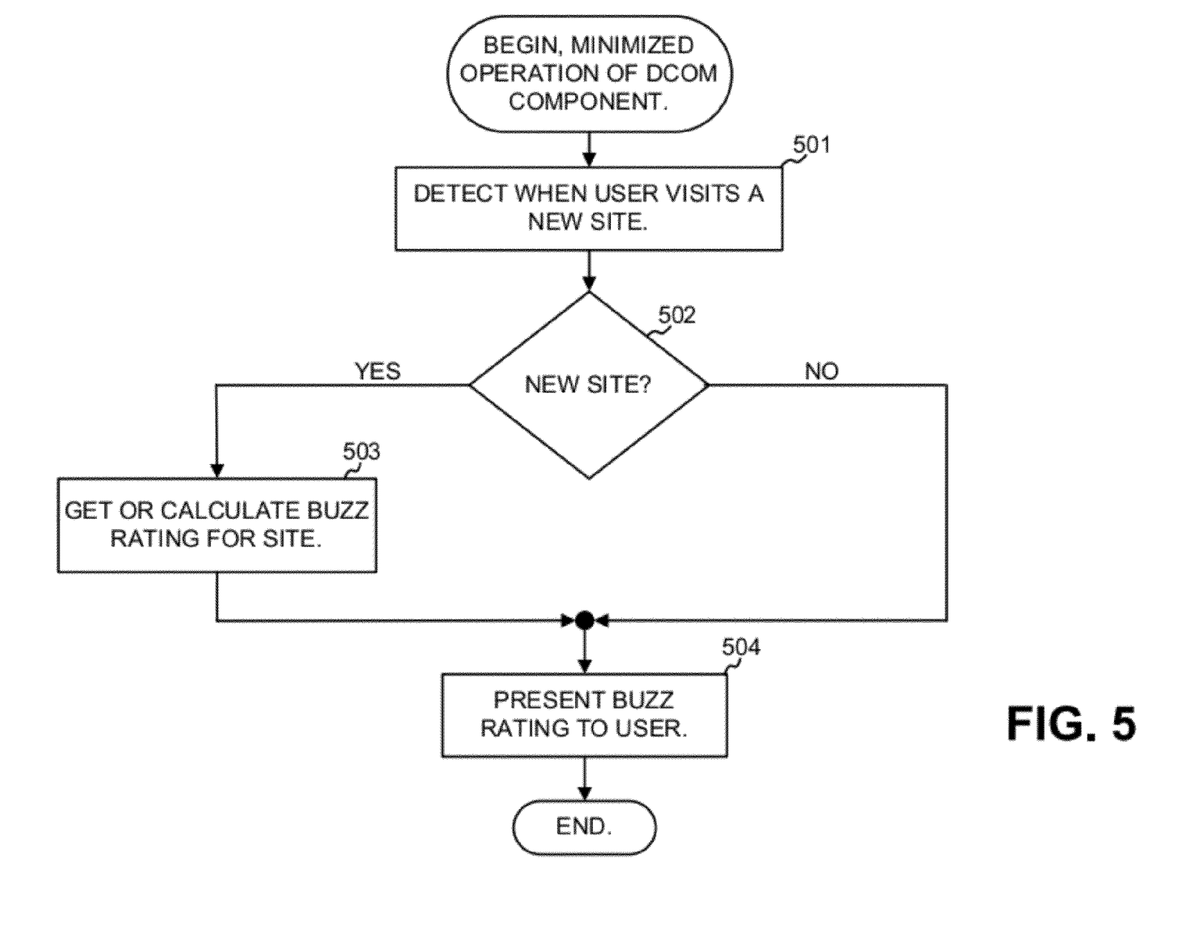
FIG. 5 is a flow chart illustrating exemplary operations that may be performed during minimized operation of the DCom component.

FIG. 5 is a flow chart illustration exemplary operations that may be performed during minimized operation of DCom component 118. DCom component 118 may monitor the browsing session of the user for changes to the web site or web page the user is viewing (act 501). When DCom component 118 detects a new site, or possibly, a new web page within a site, DCom component 118 may obtain the buzz rating, or information that can be used to obtain the buzz rating, for the site (acts 502 and 503). The buzz rating is designed to generally reflect the likelihood that a user will want to view the annotations for the site. As previously mentioned, the buzz rating may be based on some combination of the number, quality, or timeliness of the annotations associated with the web site.

In one implementation, DCom component 118 may calculate the buzz rating based on the examination of the annotations (i.e., blog posts) that correspond to a site. The annotations may be obtained by querying a blog search engine, such as search engine 125, in a manner that restricts the search results to blog posts that link to the current site. For example, queries to the existing Google™ blog search engine of the form "link: <URL>" restricts results to blog posts that link to "URL." Using the example web site shown in FIG. 3A, DCom component may submit the query "link: labs.google.com". The results of this query from search engine 125 may include a number of blog posts for this web site "labs.google.com". Based on the number, timeliness, and/or quality of these blog posts, DCom component 118 may generate the buzz rating. As one example of generating a buzz rating, the buzz rating may be equal to the number of blog posts returned from search engine 125 that is more recent than a particular cut-off date (such as the date associated with the last time the user visited the site).

The buzz rating calculated in act 503 may be presented to the user (act 504). For example, the buzz rating may be visually presented to the user via buzz icon 325. As previously mentioned, buzz icon 325 may be designed so that sites with a high "buzz" rating are given a "stronger" (visually more distinctive) icon.

Figure 6:
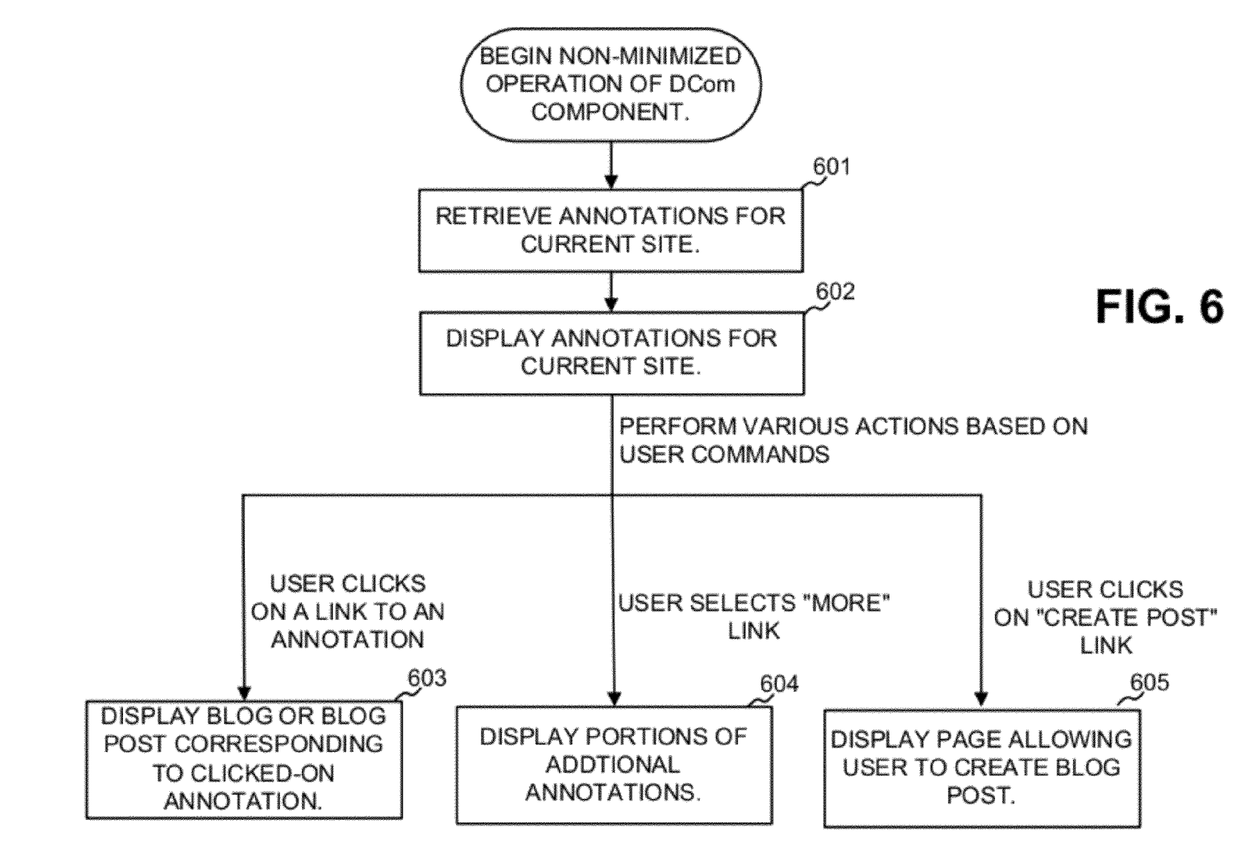
FIG. 6 is a flow chart illustrating exemplary operations that may be performed during operation of the DCom component.

FIG. 6 is a flow chart illustrating exemplary operations that may be performed during operation of DCom component 118 when the user is viewing the main user interface for DCom component 118 (e.g., when the user has clicked buzz icon 325 to display sidebar 355). DCom component 118 may retrieve the annotations, or links to the annotations, for the current site, such as by querying search engine 125 (act 601). The annotations may previously have been downloaded by DCom component 118 in generating the buzz rating (FIG. 5). In this situation, DCom component 118 may not need to re-query search engine 125. The annotations, or a pre-selected number of the annotations, may then be displayed to the user (act 602). In the example shown in FIG. 3B, three annotations for the current site are shown to the user in sidebar 355. DCom component 118 may appropriately respond to user actions in sidebar 355. For example, if the user clicks on a link associated with one of the annotations, browser 115 may be directed to display the complete blog or blog post corresponding to the annotation (act 603). In situations where more annotations are available, the user may choose to see more annotations in sidebar 355, such as by selecting the "more" link 355 (act 604). Still further, the user may choose to post a comment about the current site by creating a post for their blog (act 605). The user may initiate their blog post by selecting "create post" link 367. Doing so may, for example, take the user to a web page at which the user may manage the blog and, in particular, create a new post for the blog. The new blog post may be preset to include a link back to the current site (i.e., "labs.google.com" in the example shown in FIG. 3B).

Exemplary Additional User Interfaces

As mentioned, the user interface shown in FIGS. 3A and 3B are exemplary. Additional exemplary user interfaces that may be provided by DCom component 118 will now be described with reference to FIGS. 7A-7D. In this exemplary implementation of DCom component 118, DCom component 118 may communicate with the user through popup windows instead of through the sidebar shown in FIG. 3B. In some implementations, how DCom component 118 communicates with the user, such as a popup window or browser sidebar windows, may be a user-configurable parameter.

Figure 7A:
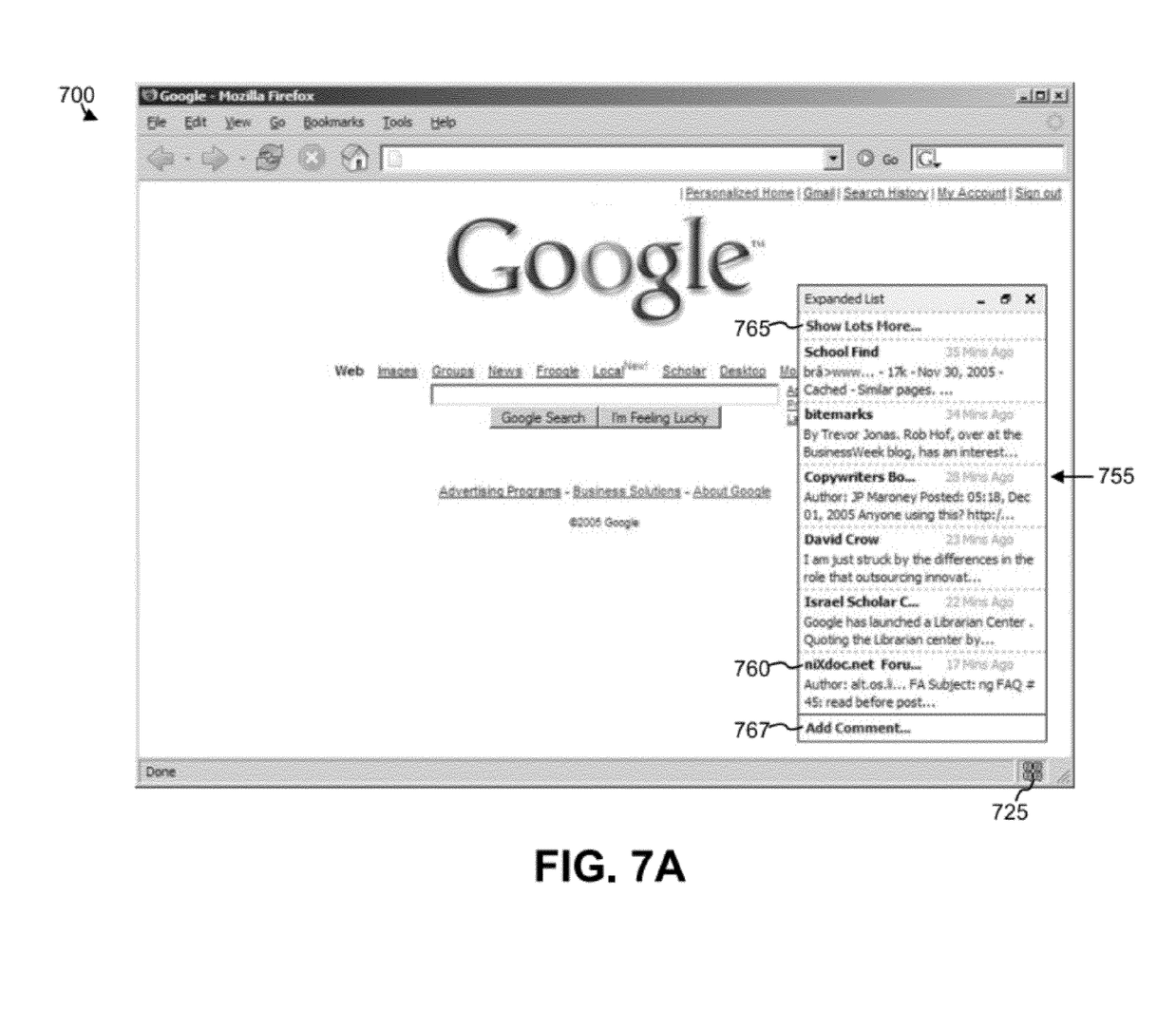
FIGS. 7A-7D are diagrams of additional exemplary graphical user interfaces that may be presented to a user by the DCom component and the browser.

FIG. 7A is a diagram illustrating an exemplary graphical user interface 700 for a web browser 115 presented to a client 110 using DCom component 118. Graphical user interface 700 may include a buzz icon 725 that functions similarly to buzz icon 325. Instead of sidebar 355, graphical user interface 700 may include a popup window 755 that displays a number of annotations for the site currently being viewed. Popup window 755 may include a header link 760 for each annotation, a "show lots more" link 765, and an "add comment" link 767. Header link 760, when selected by the user, may open a web browsing window at the blog post corresponding to the header. Show lots more link 765 and add comment link 767 may function similarly to "more" link 365 and "create post" link 367, respectively. Specifically, show lots more link 765, when selected, causes additional annotations for the web site, if available, to be displayed in popup window 755. Add comment link 767 may provide a convenient entry point through which the user may create a blog post in their own blog about the web site.

Figure 7B:
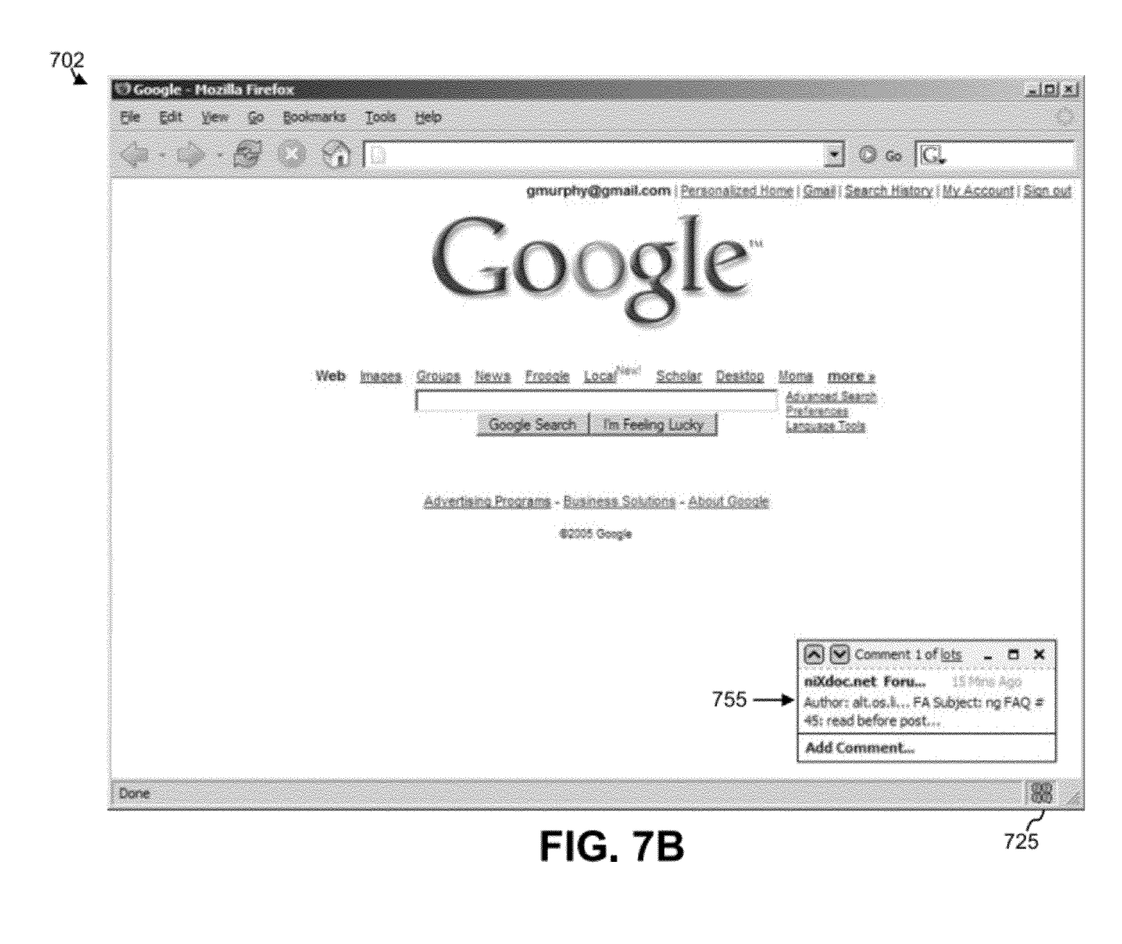

FIG. 7B is a diagram illustrating an exemplary graphical user interface 702 in which popup window 755 is shown as a smaller popup window. Users may switch between the larger version of popup window 755 and the smaller version of popup window 755 using standard sizing icons in the upper right corner of the window.

Figure 7C:
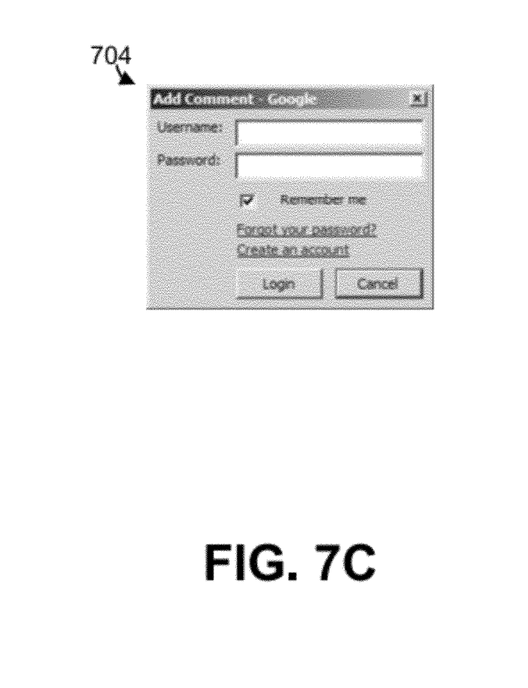

FIG. 7C is a diagram illustrating an exemplary popup dialog 704 that may be provided to the user when the user selects "add comment" 767 link without having a registered blog. As shown, dialog 704 provides fields through which users may enter their blog username and password. Additionally, dialog 704 provides a link through which the user may register for a new blog and a link through which the user may recover a forgotten password.

Figure 7D:
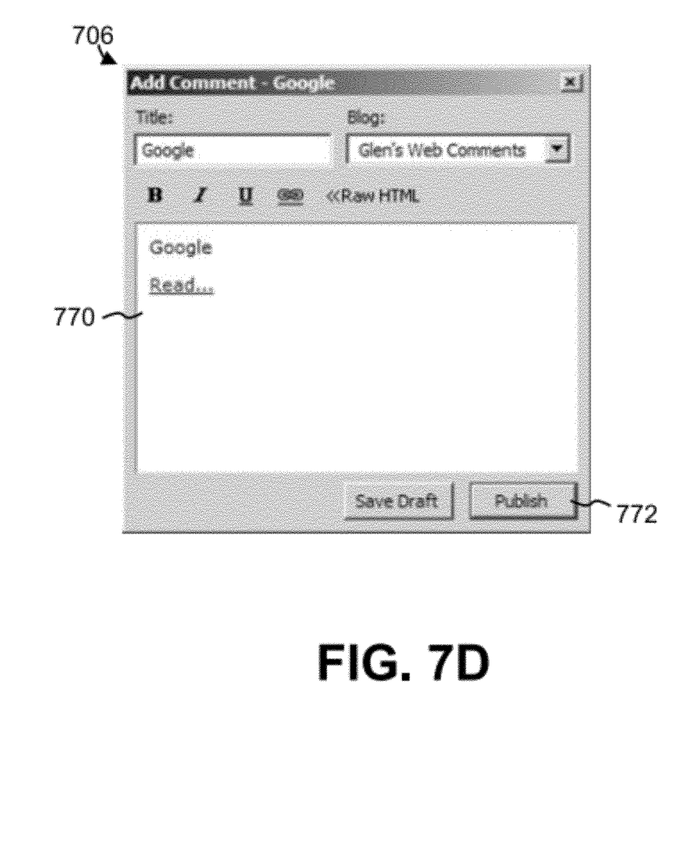

FIG. 7D is a diagram illustrating an exemplary dialog 706 that may be provided to the user when the user selects "add comment" link 767 and the user has registered their blog. As shown, dialog 706 provides an area 770 in which the user may compose their blog post. Area 770 may be pre-populated with a link back to the web page currently being viewed. In the example shown in FIG. 7D, this link is illustrated as the underlined text "Read . . . ". When the user is ready to publish the blog post to his/her blog, the user may select "publish" button 772.

Although DCom component 118 was generally described above as receiving and operating on web annotations from a blog search engine, DCom component 118 may more generally operate to receive annotations from other search engines in which the search results are in someway limited by the site or web page currently being visited. More generally, DCom component 118 may operate to receive annotation information from any other website that links to and in someway comments on the current web site. The linking websites may include websites that in someway provide reviews, commentary, critiques, or feedback to the current website or webpage. Additionally, instead of receiving annotations from a search engine, DCom component 118 may receive the annotations from a different server, such as an annotation server designed to operate specifically with DCom component 118.

Conclusion

Techniques for providing decentralized user web annotations were described above. The web annotations may be based on blog posts, providing the system with an existing initial base of web annotations. Additionally, because the annotations may be received from a blog search engine, which may already provide quality and/or spam filtering controls on the blogs it is indexing, the annotations are likely to be less spammy or inappropriate relative to existing web annotation systems.

The foregoing description of exemplary embodiments of the invention provides illustration and description, but are not intended to be exhaustive or to limit the invention to the precise form disclosed. Modifications and variations are possible in light of the above teachings or may be acquired from practice of the invention.

For example, while a series of acts have been described with regard to FIGS. 4-6, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a client device, the method comprising:

receiving, at one or more processors of the client device and based on a search request, a plurality of annotations that link to a website, each annotation of the plurality of annotations being a portion of a post that links to the website;

displaying the plurality of annotations while the client device is visiting the website;

calculating, by one or more processors of the client device, a rating for the website based on one or more characteristics relating to the plurality of annotations, the one or more characteristics including a quantity of annotations received in a particular period of time; and displaying an icon that reflects the calculated rating.

2. The method of claim 1, where the plurality of annotations include blog posts.

3. The method of claim 1, where displaying the plurality of annotations includes displaying a sidebar or popup window that includes the plurality of annotations.

4. The method of claim 1, where receiving the plurality of annotations includes:
   detecting that the client device is visiting the web site, and
   receiving the plurality of annotations based on detecting that the client device is visiting the website.

5. The method of 1, where the rating is based on a quantity of annotations received since the client device last visited the website.

6. The method of claim 1, where an appearance of the icon changes as the calculated rating changes.

7. The method of claim 1, where calculating the rating further comprises calculating the rating based on a number, quality, or timeliness of the plurality of annotations.

8. A non-transitory computer-readable medium for storing instructions, the instructions comprising:
   one or more instructions that, when executed by one or more processors, cause the one or more processors to:
   present a browser window that displays a website;
   present a window that displays a plurality of annotations that link to the website, each annotation of the plurality of annotations being a portion of a post that links to the website, the plurality of annotations being presented based on a search request; and
   present an icon, that is part of the browser window, that displays a rating associated with the website, the rating being based on one or more characteristics of the plurality of annotations, the one or more characteristics including a quantity of annotations received in a particular period of time.

9. The computer-readable medium of claim 8, where the plurality of annotations include blog posts.

10. The computer-readable medium of claim 8, where the window includes a popup window or a sidebar.

11. The computer-readable medium of claim 8, where the window further displays a header link associated with each annotation of the plurality of annotations.

12. The computer-readable medium of claim 11, where a header link for a particular annotation of the plurality of annotations, when selected, causes a window associated with the particular annotation to be opened.

13. The computer-readable medium of claim 8, where the icon is displayed in a visually more distinctive manner when a higher rating is associated with the website than when a lower rating is associated with the website.

14. The computer-readable medium of claim 8, where the icon includes a graphical bar.

15. A client device comprising:
   one or more processors to:
   receive, based on a search request, a plurality of annotations that link to a website, each annotation of the plurality of annotations being a portion of a post that links to the website;
   display the plurality of annotations while the client device is visiting the website;
   calculate a rating for the website based on one or more characteristics relating to the plurality of annotations, the one or more characteristics including a quantity of the plurality of annotations received in a particular period of time; and
   display an icon that reflects the calculated rating.

16. The client device of claim 15, where the plurality of annotations include blog posts.

17. The client device of claim 15, where, when displaying the plurality of annotations, the one or more processors are further to display a sidebar or popup window that includes the plurality of annotations.

18. The client device of claim 15, where, when receiving the plurality of annotations, the one or more processors are further to:
   detect that the client device is visiting the website, and
   receive the plurality of annotations based on detecting that the client device is visiting the website.

19. The client device of claim 15, where an appearance of the icon changes as the calculated rating changes.

20. The client device of claim 15, where, when calculating the rating, the one or more processors are further to calculate the rating based on a number, quality, or timeliness of the plurality of annotations.

\* \* \* \* \*